United States Patent [19]

Hicks

[11] 4,307,561
[45] Dec. 29, 1981

[54] BLADE HOUSING LIFT FOR RIDING MOWER

[75] Inventor: John E. Hicks, Lincoln, Nebr.

[73] Assignee: Outboard Marine Corporation, Waukegan, Ill.

[21] Appl. No.: 114,654

[22] Filed: Jan. 23, 1980

[51] Int. Cl.³ ............................................. A01D 35/12
[52] U.S. Cl. ..................... 56/15.9; 187/9 R
[58] Field of Search ............... 56/DIG. 22, 15.9, 16.1, 56/16.2, 16.3, 15.7, 15.8; 187/9 R

[56] References Cited

U.S. PATENT DOCUMENTS

| | | | |
|---|---|---|---|
| 2,949,004 | 8/1960 | Jones | 56/DIG. 22 |
| 3,666,053 | 5/1972 | Tormey | 187/9 R |
| 3,702,051 | 11/1972 | Deines | 56/15.9 |
| 3,777,853 | 12/1973 | Miller | 187/9 R |
| 3,874,150 | 4/1975 | Boeck | 56/15.9 |
| 4,187,924 | 2/1980 | Deschamps | 56/DIG. 22 |

Primary Examiner—Robert A. Hafer
Attorney, Agent, or Firm—Michael, Best & Friedrich

[57] ABSTRACT

The riding mower (10) includes a prime mover (12) and a cutter blade housing (28) mounted on the prime mover (12) for pivotal movement between a lowered mowing position and a raised non-mowing position. The blade housing (28) is moved between the mowing and non-mowing positions by a flexible member (56), such as a chain, having a first end (58) connected to the blade housing (28) and a second end (60) connected to the prime mover (12) and a fluid-actuated cylinder (64) including a piston rod (66) carrying an arcuate element (68), such as a pulley, which engages an intermediate portion (62) of the chain (56) and lifts it in response to extension of the piston rod (66). The chain (56) is maintained in tension and in engagement with the pulley (68) at all times by a spring-biased arm (70) pivotally mounted on the prime mover (12) and connected to the second end (60) of the chain (56).

7 Claims, 3 Drawing Figures

U.S. Patent
Dec. 29, 1981
4,307,561
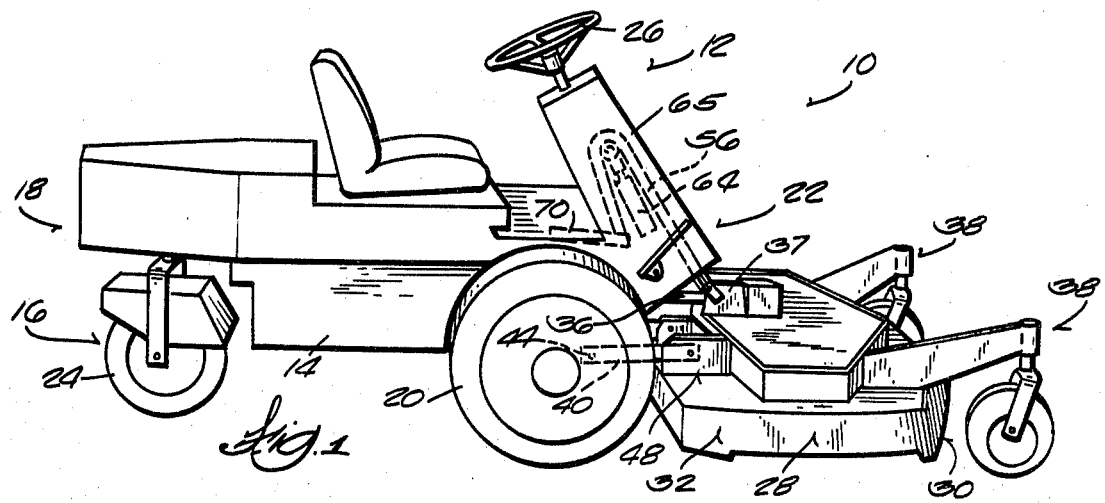
Fig. 1
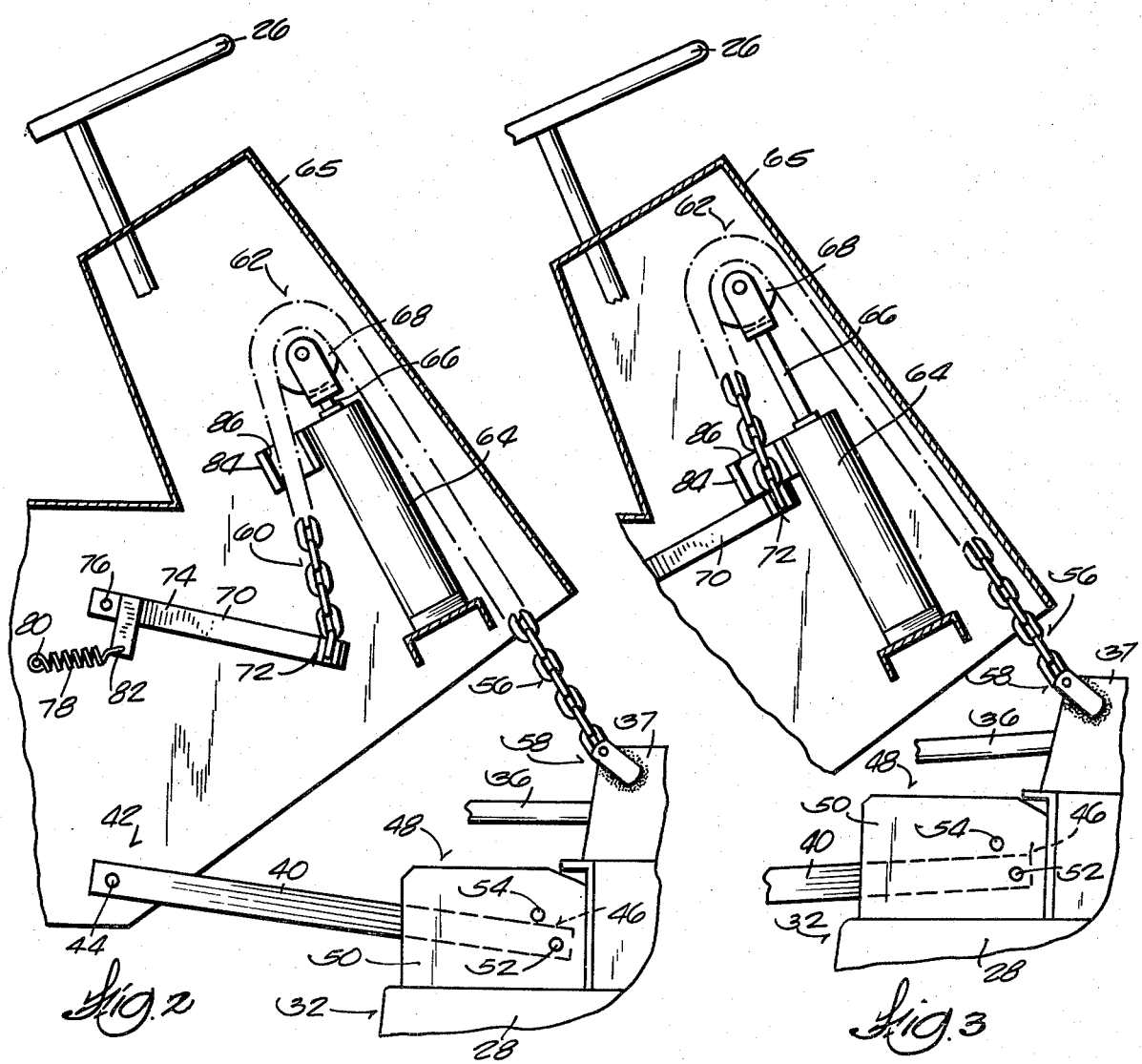
Fig. 2
Fig. 3

BLADE HOUSING LIFT FOR RIDING MOWER

BACKGROUND OF THE INVENTION

This invention relates to riding mowers and, more particularly, to riding mowers including a cutter blade housing mounted for pivotal movement between mowing and non-mowing positions and power lift means for moving the cutter blade housing between these positions.

Riding rotary mowers typically include a cutter blade housing mounted on a prime mover for pivotal movement between a lowered mowing position and a raised non-mowing position. For larger mowers having a blade housing carrying a plurality of cutter blades, a power hoist or lift is used for raising and lowering the blade housing. One type hoist or lift employs a flexible member, such as a chain or cable, connected between the blade housing and the prime mover and trained over an idler pulley or the like which is lifted to raise the blade housing to non-mowing position and is lowered to permit the housing to return by gravity to the mowing position. In prior art constructions, the chain or cable typically is in a slack condition when the blade housing is in the mowing position and is free to hang and bang against the blade housing or other parts. When this occurs, the chain or cable can be tangled and/or damaged.

Examples of prior art constructions of hoists or lifts for various implements and equipment including a chain or other flexible member are disclosed in the following U.S. Patents:

| U.S. Pat. No. | Number | Issue Date |
| --- | --- | --- |
| Staver | 202,383 | April 16, 1878 |
| Lehr | 353,148 | Nov. 23, 1886 |
| Olsen | 1,499,190 | June 24, 1924 |
| Johnson | 1,505,201 | Aug. 19, 1924 |
| Coffman | 1,755,574 | April 22, 1930 |
| Weems | 2,123,579 | July 12, 1938 |

SUMMARY OF THE INVENTION

The invention provides a riding mower including a prime mower, a cutter blade housing mounted on the prime mover for movement between a lowered mowing position and a raised non-mowing position. The blade housing is moved between the mowing and non-mowing positions by a flexible member connected between the blade housing and the prime mover and a lift means mounted on the prime mover for engaging an intermediate portion of the flexible member and lifting it to a raised position to move the cutter blade housing from the mowing position toward the non-mowing position and for returning the flexible member to a lowered position to permit the blade housing to move from the non-mowing position to the mowing position. One end of the flexible member is connected to the prime mover by means arranged to maintain the flexible member in tension throughout movement of the cutter blade housing between the mowing and non-mowing positions.

In one embodiment, the lift means includes a fluid-actuated cylinder including an extendable and retractable piston rod carrying an arcuate element slidably receiving the intermediate portion of the flexible member.

In one embodiment, the one end of the flexible member is connected to an arm pivotally mounted on the prime mover for pivotal movement relative to the prime mover and the arm is biased in a first direction about its pivot axis to maintain the flexible in tension. Means are provided for limiting pivotal movement of the arm in a second direction opposite to the first direction during movement of the lift means from the lowered position toward the raised position.

A principal object of the invention is the provision of a riding mower having a blade housing mounted on a prime mover for movement between the mowing and non-mowing positions, a blade housing lift including a flexible member connected between the blade housing and the prime mover, and simple, reliable means for maintaining the flexible member in tension at all times.

Another principal object of the invention is a provision of such a riding mower arranged to afford upward and downward pivotal movement of the blade housing relative to the primer mover as the blade housing traverses uneven ground when in the mowing position.

Other features and aspects of the invention will become apparent to those skilled in the art upon reviewing the following detailed description, the drawings and the appended claims.

BRIEF DESCRIPTION OF THE DRAWINGS

FIG. 1 is a perspective view of a riding mower embodying various of the features of the invention.

FIG. 2 is an enlarged, fragmentary view of the front end portion of the prime mover and the trailing end portion of the cutter blade housing, showing the location of various parts when the cutter blade housing is in the lowered mowing position.

FIG. 3 is a view similar to FIG. 2 illustrating the location of various parts when the cutter blade housing is in the raised non-mowing position.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology and terminology employed herein is for the purpose of description and not of limitation.

GENERAL DESCRIPTION

Illustrated in the drawings is a riding rotary mower 10 including a vehicle or prime mover 12 having a chassis 14 supported for travel over the ground by a steering unit 16 mounted on the rear end portion 18 of the chassis 14 and a pair of laterally spaced wheels 20 (one shown) rotatably mounted on the front end portion 22 of the chassis 14.

The steering unit 16 includes one or more rear wheels 24 (one shown). A power source (not shown), such as an electric motor, a hydraulic motor or an internal combustion engine, is drivingly connected either to the front wheels 20 or the rear wheels 24 through a suitable drive train (not shown). Steering movement of the steering unit 16 is accomplished by a steering wheel 26 operatively connected to the steering unit 16 in a suitable manner.

Located forwardly of the front wheels 20 is a cutter blade housing 28 having a leading end portion 30 and a trailing end portion 32 with respect to the direction of travel. Disposed inside the blade housing 28 is a plurality (e.g., 3) of rotary cutting blades (not shown) which are mounted for rotation about a vertical axis and are driven by the prime mover power source via a suitable power take-off 36 partially covered by a guard 37. The leading end portion 30 of the blade housing 28 is supported for travel along the ground by a pair of laterally spaced caster wheel assemblies 38 located on the opposite sides of the centerline of the blade housing 28 extending generally parallel to the direction of travel.

The blade housing 28 is mounted on the prime mover 12 for pivotal movement about a generally horizontal axis between a lowered mowing position shown in FIGS. 1 and 2 and a raised non-mowing position shown in FIG. 3. While various arrangements can be used, in the specific construction illustrated, there is provided a pair of pusher arms 40 (one shown), each having an inner end 42 pivotally mounted on the prime mover chassis 14 at 44 and an outer end portion 46 pivotally mounted on the trailing end portion 32 of the blade housing 28 on the opposite sides of the centerline thereof via a pivot mount 48. Each pivot mount 48 includes a pair of plates 50 (one shown in FIGS. 2 and 3) between which the inner end 42 of one of the pusher arms 40 extends and a pin 52 extending through the plates 50 and the outer end 46 of the pusher arm 40 to afford free upward pivotal movement of the blade housing 28 relative to the pusher arm 40. Downward pivotal movement of the blade housing 28 relative to the pusher arm 40 and the prime mover 12 is limited by a pin 54 extending through the plates 50 and engaged by the upper surface of the pusher arm 40.

The blade housing 28 is moved between the mowing and non-mowing positions via a flexible member 56, such as a chain or cable, having a first or outer end 58 fixedly connected to the blade housing 28, such as on the power take off guard 37, and a second or inner end 60 connected to the prime mover 12. Lift means are provided on the prime mover 12 for engaging a portion 62 of the flexible member 56 intermediate the outer and inner ends 58 and 60 and raising and lowering the intermediate portion 62 of the flexible member 56. In the specific construction illustrated, the lift means (FIGS. 2 and 3) includes a fluid-actuated cylinder 64, such as a double acting hydraulic cylinder, mounted on the front end of the prime mover 12 and enclosed by a cowling 65. The cylinder 64 includes an extendable and retractable piston rod 66 carrying an arcuate element 68, such as a pulley, which slidably receives the intermediate portion 62 of the flexible member 56 and serves as an idler for the flexible member 56. The intermediate portion 62 of the flexible member 56 is raised to move the blade housing 28 from the mowing position to the non-mowing position in response to extension of the piston rod 66 (FIG. 3) and is lowered to permit the blade housing 28 to move by gravity from the non-mowing position to the mowing position in response to retraction to the piston rod 66. (FIG. 2).

If the inner end 60 of the flexible member 56 were fixedly connected to the prime mover 12, the flexible member could be slack when the piston rod 66 is in the retracted position and tend to hang free in a manner permitting it to hang against the blade housing 28 and other parts and become tangled and/or damaged.

This problem is obviated by providing means connecting the inner end 60 of the flexible member 56 to the prime mover 12 for maintaining the flexible member 56 in tension throughout movement of the blade housing 28 between the mowing and non-mowing positions. While various arrangements can be used, in the specific construction illustrated, such means includes (FIG. 2) an arm 70 having one end 72 connected to the flexible member 56 and the other end 74 pivotally connected to the prime mover 12, via a pilot pin 76 or the like, for vertical pivotal movement of the arm 70 relative to the prime mover 12. A coiled tension spring 78 connected at one end to the prime mover 12 at 80 and at the other end to the arm 70 at 82 biases the arm 70 in a first or clockwise direction as viewed in FIG. 2 to maintain the flexible member 56 in tension and in engagement with the arcuate element 68 when the piston rod 66 is retracted.

During initial extension of the piston rod 66, the arm 70 pivots about the pivot axis provided by the pin 76 in a second or counterclockwise direction as viewed in FIG. 2 against the biasing force of the spring 78. Means are provided for limiting pivotal movement of the arm 70 in the counterclockwise direction and thereby prevent further movement of the inner end 60 of the flexible member 56 during continued extension of the piston rod 66. In the specific construction illustrated, such means comprises a stationary stop 84 on the cylinder 66. The inner end portion of the flexible member 56 extends through and is guided by a guideway 86 in the stop 84. After the arm 70 engages the stop 84, continued extension of the piston rod 66 continues to raise the intermediate portion 62 of the flexible member 56 and the blade housing 28 is moved from the mowing position to the non-mowing position.

As the piston rod 66 is retracted, the clockwise biasing force of the spring 78 on the arm 70 maintains the flexible member 56 in engagement with the arcuate element 68. When the blade housing 28 is in the mowing position, the spring 78 maintains the flexible member 56 in engagement with the arcuate element 68 during upward pivotal movement of the blade housing 28 relative to the prime mover 12 upon encountering a rise in the ground. On the other hand, the spring 78 permits limited pivotal movement of the arm 70 in the counterclockwise direction, and thus, permits downward pivotal movement of the blade housing 28 relative to the prime mover 12 upon encountering a depression in the ground.

With this arrangement, the flexible member 56 is maintained taut at all times to prevent damage and the blade housing 28 is free to travel up and down as it traverses uneven ground.

Various of the features of the invention are set forth in the following claims.

I claim:

1. A riding mower comprising a prime mover having a chassis mounted on wheels for movement over the ground, a cutter blade housing, means mounting said cutter blade housing on said prime mover for movement between a lowered mowing position and a raised non-mowing position, and means for moving said cutter blade housing between the mowing and non-mowing positions including a flexible member having a first end fixedly connected to said cutter blade housing and a second end connected to said prime mover, lift means mounted on said prime mover for engaging a portion of said flexible member intermediate said first and second ends and for lifting said intermediate portion relative to said prime mover to a raised position to move said cutter blade housing from the mowing position toward the non-mowing position and for returning said intermediate portion to a lowered position to permit said cutter blade housing to move from the non-mowing position to the mowing position, and resilient means connecting said second end of said flexible member to said prime mover for maintaining said flexible member in tension throughout movement of said cutter blade housing between the mowing and non-mowing positions.

2. A riding mower according to claim 1 wherein said means connecting said second end of said flexible member to said prime mover permits downward pivotal movement of said cutter blade housing relative to said prime mover when said cutter blade housing is in the mowing position.

3. A riding mower according to claim 1 wherein said lift means comprises a fluid-actuated cylinder including an extendable and retractable piston rod carrying an arcuate element slidably receiving the intermediate portion of said flexible member, said intermediate portion of said flexible member being lifted in response to extension of said piston rod and being lowered in response to retraction of said piston rod.

4. A riding mower comprising a prime mover having a chassis mounted on wheels for movement over the ground, a cutter blade housing, means mounting said cutter blade housing on said prime mover for movement between a lowered mowing position and a raised non-mowing position, and means for moving said cutter blade housing between the mowing and non-mowing positions including a flexible member having a first end fixedly connected to said cutter blade housing and a second end connected to said prime mover, lift means mounted on said prime mover for engaging a portion of said flexible member intermediate said first and second ends and for lifting said intermediate portion relative to said prime mover to a raised position to move said cutter blade housing from the mowing position toward the non-mowing position and for returning said intermediate portion to a lowered position to permit said cutter blade housing to move from the non-mowing position to the mowing position, an arm having one end connected to said second end of said flexible member and an opposite end pivotally mounted on said prime mover for pivotal movement relative to said prime mover, means for biasing said arm in a first direction about its pivot axis to maintain said flexible member in tension when said lift means is moved toward the lowered position, and means for limiting pivotal movement of said arm in a second direction opposite to said first direction during movement of said lift means from the lowered position toward the raised position.

5. A riding mower according to claim 4 wherein said lift means comprises a fluid-actuated cylinder including an extendable and retractable piston rod carrying an arcuate element slidably receiving the intermediate portion of said flexible member, said intermediate portion of said flexible member being lifted in response to extension of said piston and being lowered in response to retraction of said piston, and wherein said means for limiting pivotal movement of said arm comprises a stationary stop on said cylinder engaged by said arm.

6. A riding mower comprising a prime mover having a chassis mounted on wheels for movement over the ground, a cutter blade housing, means mounting said cutter blade housing on said prime mover for pivotal movement about a generally horizontal axis between a lowered mowing position and a raised non-mowing position, an arm having a first end mounted on said prime mover for pivotal movement of said arm relative to said prime mover and having a second end, means on said prime mover for biasing said arm in a first direction about its pivot axis, stop means on said prime mover for engaging said arm and limiting pivotal movement of said arm in a second direction opposite to said first direction, a fluid-actuated cylinder mounted on said prime mover and including an upwardly extending, extendable and retractable piston carrying an arcuate element, and a flexible member having a first end fixedly connected to said cutter blade housing, a second end connected to said second end of said arm, and an intermediate portion slidably received by said arcuate element, whereby said cutter blade housing is moved from the mowing position to the non-mowing position in response to extension of said piston rod after said arm engages said stop means and said cutter blade housing moves from the non-mowing position to the mowing position in response to retraction of said piston rod with said flexible member being maintained in tension by said biasing means.

7. A riding mower comprising a prime mover having a chassis mounted on wheels for movement over the ground, a cutter blade housing, means mounting said cutter blade housing on said prime mover for movement between a lowered mowing position and a raised non-mowing position, and means for moving said cutter blade housing between the mowing and non-mowing positions including a flexible member having a first end fixedly connected to said cutter blade housing and a second end connected to said prime mover, lift means mounted on said prime mover for engaging a portion of said flexible member intermediate said first and second ends and lifting said intermediate portion relative to said prime mover to a raised position to move said cutter blade housing from the mowing position toward the non-mowing position and for returning said intermediate portion to a lowered position to permit said cutter blade housing to move from the non-mowing position to the mowing position, an arm having one end connected to said second end of said flexible member and an opposite end pivotally mounted on said prime mover for pivotal movement relative to said prime mover, and means for biasing said arm in a first direction about its pivot axis to maintain said flexible member in tension when said lift means is moved toward the lowered position.

* * * * *